United States Patent
Droppo et al.

(10) Patent No.: US 7,460,992 B2
(45) Date of Patent: *Dec. 2, 2008

(54) METHOD OF PATTERN RECOGNITION USING NOISE REDUCTION UNCERTAINTY

(75) Inventors: James G. Droppo, Duvall, WA (US); Alejandro Acero, Bellevue, WA (US); Li Deng, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/435,254

(22) Filed: May 16, 2006

(65) Prior Publication Data

US 2006/0206325 A1    Sep. 14, 2006

Related U.S. Application Data

(62) Division of application No. 10/152,127, filed on May 20, 2002, now Pat. No. 7,103,540.

(51) Int. Cl.
G10L 15/20 (2006.01)
G10L 21/02 (2006.01)

(52) U.S. Cl. .................. 704/226; 704/233; 704/240

(58) Field of Classification Search .............. 704/226, 704/227, 228, 233, 240, 255, 256.2, 256.3
See application file for complete search history.

(56) References Cited

U.S. PATENT DOCUMENTS

| | | | |
|---|---|---|---|
| 4,897,878 A | 1/1990 | Boll et al. | 704/233 |
| 4,905,286 A * | 2/1990 | Sedgwick et al. | 704/233 |
| 5,148,489 A | 9/1992 | Erell et al. | 704/226 |
| 5,598,505 A * | 1/1997 | Austin et al. | 704/226 |
| 5,604,839 A | 2/1997 | Acero et al. | 704/234 |
| 5,924,065 A | 7/1999 | Eberman et al. | 704/231 |
| 6,035,057 A * | 3/2000 | Hoffman | 382/159 |
| 6,098,040 A | 8/2000 | Petroni et al. | 704/234 |
| 6,173,258 B1 | 1/2001 | Menendez-Pidal et al. | 704/233 |
| 6,202,047 B1 | 3/2001 | Ephraim et al. | 704/256.6 |
| 6,418,411 B1 | 7/2002 | Gong | 704/256.5 |
| 6,577,997 B1 | 6/2003 | Gong | 704/252 |
| 6,633,842 B1 | 10/2003 | Gong | 704/233 |

(Continued)

OTHER PUBLICATIONS

U.S. Appl. No. 10/152,143, filed May 20, 2002, Li Deng et al.

(Continued)

Primary Examiner—Martin Lerner
(74) Attorney, Agent, or Firm—Westman, Champlin & Kelly, P.A.; Theodore M. Magee

(57) ABSTRACT

A method and apparatus are provided for using the uncertainty of a noise-removal process during pattern recognition. In particular, noise is removed from a representation of a portion of a noisy signal to produce a representation of a cleaned signal. In the meantime, an uncertainty associated with the noise removal is computed and is used with the representation of the cleaned signal to modify a probability for a phonetic state in the recognition system. In particular embodiments, the uncertainty is used to modify a probability distribution, by increasing the variance in each Gaussian distribution by the amount equal to the estimated variance of the cleaned signal, which is used in decoding the phonetic state sequence in a pattern recognition task.

10 Claims, 6 Drawing Sheets

U.S. PATENT DOCUMENTS

| | | | |
|---|---|---|---|
| 6,633,843 B2 | 10/2003 | Gong | 704/233 |
| 6,865,531 B1 | 3/2005 | Huang | 704/226 |
| 6,876,966 B1 | 4/2005 | Deng et al. | 704/233 |
| 6,898,566 B1 | 5/2005 | Benyassine et al. | 704/226 |
| 6,915,259 B2 | 7/2005 | Rigazio et al. | 704/244 |
| 6,944,590 B2 | 9/2005 | Deng et al. | 704/228 |
| 6,959,276 B2 | 10/2005 | Droppo et al. | 704/226 |
| 6,980,952 B1 | 12/2005 | Gong | 704/234 |
| 6,985,858 B2 | 1/2006 | Frey et al. | 704/233 |
| 6,990,447 B2 | 1/2006 | Attias et al. | 704/240 |
| 7,003,455 B1 | 2/2006 | Deng et al. | |
| 7,103,540 B2* | 9/2006 | Droppo et al. | 704/226 |
| 7,107,210 B2 | 9/2006 | Deng et al. | 704/226 |
| 7,117,148 B2* | 10/2006 | Droppo et al. | 704/228 |
| 7,174,292 B2 | 2/2007 | Deng et al. | 704/226 |
| 7,181,390 B2* | 2/2007 | Droppo et al. | 704/226 |
| 7,254,536 B2* | 8/2007 | Deng et al. | 704/226 |
| 7,266,494 B2* | 9/2007 | Droppo et al. | 704/228 |
| 7,289,955 B2* | 10/2007 | Deng et al. | 704/226 |
| 7,363,221 B2* | 4/2008 | Droppo et al. | 704/226 |
| 2003/0055627 A1 | 3/2003 | Balan et al. | 704/200.1 |
| 2003/0055640 A1 | 3/2003 | Burshtein et al. | 704/235 |
| 2003/0191638 A1 | 10/2003 | Droppo et al. | 704/228 |

OTHER PUBLICATIONS

U.S. Appl. No. 10/152,127, filed May 20, 2002, James G. Droppo et al.

U.S. Appl. No. 10/236,042, filed Sep. 5, 2002, Li Deng et al.

"HMM Adaptation Using Vector Taylor Series for Noisy Speech Recognition," Alex Acero, et al., Proc. ICSLP, vol. 3, 2000, pp. 869-872.

"Sequential Noise Estimation with Optimal Forgetting for Robust Speech Recognition," Mohomed Afify, et al., Proc. ICASSP, vol. 1, 2001, pp. 229-232.

"High-Performance Robust Speech Recognition Using Stereo Training Data," Li Deng, et al., Proc. ICASSP, vol. 1, 2001, pp. 301-304.

"Algonquin: Iterating Laplace's Method to Remove Multiple Types of Acoustic Distortion for Robust Speech Recognition," Brendan J. Frey, et al., Proc. Eurospeech, Sep. 2001, Aalborg, Denmark.

"Nonstationary Environment Compensation Based on Sequential Estimation," Nam Soo Kim, IEEE Signal Processing Letters, vol. 5, 1998, pp. 57-60.

"On-line Estimation of Hidden Markov Model Parameters Based on the Kullback-Leibler Information Measure," Vikram Krishnamurthy, et al., IEEE Trans. Sig. Proc., vol. 41, 1993, pp. 2557-2573.

"A Vector Taylor Series Approach for Environment-Independent Speech Recognition," Pedro J. Moreno, ICASSP, vol. 1, 1996, pp. 733-736.

"Recursive Parameter Estimation Using Incomplete Data," D.M. Titterington, J. J. Royal Stat. Soc., vol. 46(B), 1984, pp. 257-267.

"The Aurora Experimental Framework for the Performance Evaluations of Speech Recognition Systems Under Noisy Conditions," David Pearce, et al., Proc. ISCA IIRW ASR 2000, Sep. 2000.

"Efficient On-Line Acoustic Environment Estimation for FCDCN in a Continuous Speech Recognition System," Jasha Droppo, et al., ICASSP, 2001.

"Speech Recognition in Noisy Environments," Pedro J. Moreno, Ph.D thesis, Carnegie Mellon University, 1996.

"Robust Automatic Speech Recognition With Missing and Unreliable Acoustic Data," Martin Cooke, Speech Communication, vol. 34, No. 3, pp. 267-285, Jun. 2001.

"Learning Dynamic Noise Models From Noisy Speech for Robust Speech Recognition," Brendan J. Frey, et al., Neural Information Processing Systems Conference, 2001, pp. 1165-1121.

Deng et al., "Incremental Bayes Learning with Prior Evolution for Tracking Nonstationary Noise Statistic from Noisy Speech Data," ICASSP '03, Apr. 6-10, 2003, vol. 1, pp. I-672- to I-675.

Droppo et al., Noise Robust Speech Recognition with a Switching Linear Dynamic Model,: ICASSP '04, May 17-24, 2004, vol. 1, pp. I-953 to I-956.

Deng et al., "Estimating Cepstrum of Speech Under the Presence of Noise Using a Joint prior of Static and Dynamic Features," IEEE Transactions on Speech and Audio, May 2004, vol. 12, Issue 3, pp. 218-233.

"Speech Denoising and Dereverberation Using Probabilistic Models," Hagai Attias, et al., Advances in NIPS, vol. 13, 2000 pp. 758-764.

"Statistical-Model-Based Speech Enhancement Systems," Proc. of IEEE, vol. 80, No. 10, Oct. 1992, pp. 1526.

"HMM-Based Strategies for Enhancement of Speech Signals Embedded in Nonstationary Noise," Hossein Sameti, IEEE Trans. Speech Audio Processing, vol. 6, No. 5, Sep. 1998, pp. 445-455.

"Model-based Compensation of the Additive Noise for Continuous Speech Recognition," J.C. Segura, et al., Eurospeech 2001.

"Large-Vocabulary Speech Recognition Under Adverse Acoustic Environments," Li Deng, et al., Proc. ICSLP, vol. 3, 2000, pp. 806-809.

"A New Method for Speech Denoising and Robust Speech Recognition Using Probabilistic Models for Clean Speech and for Noise," Hagai Attias, et al., Proc. Eurospeech, 2001, pp. 1903-1906.

"Evaluation of the Splice Algorithm on the Aurora2 Database," Droppo, et al., Proc. Eurospeech, 2001.

"Recursive Noise Estimation Using Iterative Stochastic Approximation For Stereo-Based Robust Speech Recognition," Deng, et al., Proceedings of Automatic Speech Recognition and Understanding 2001.

Droppo, J. et al, "Uncertainty Decoding with Splice for Noise Robust Speech Recognition," Proceedings of International Conference on Acoustics, Speech and Signal Processing, pp. I-57-60, vol. 1, May 2002.

Droppo, J. et al, "Evaluation of the Splice Algorithm on the Aurora2 Database," 7th European Conference on Speech Communication and Technology, Proceedings of Eurospeech 2001, Aalborg, Denmark.

Li Deng et al, "A Bayesian Approach to Speech Feature Enhancement using the Dynamic Cepstral Prior," Proceedings of International Conference on Acoustics, Speech and Signal Processing, pp. I-829-32, vol. 1, May 2002.

PCT Search Report for International Application No. PCT/US 03/16032, Oct. 2003.

Office Action (Feb. 16, 2006) and Response (May 16, 2006) from U.S. Appl. No. 10/152,127, filed May 20, 2002.

* cited by examiner

METHOD OF PATTERN RECOGNITION USING NOISE REDUCTION UNCERTAINTY

REFERENCE TO RELATED APPLICATION

The present application is a divisional of and claims priority from U.S. patent application Ser. No. 10/152,127, filed on May 20, 2002 now U.S. Pat. No. 7,103,540, issued Sep. 5, 2006, and entitled METHOD OF PATTERN RECOGNITION USING NOISE REDUCTION UNCERTAINTY.

BACKGROUND OF THE INVENTION

The present invention relates to pattern recognition. In particular, the present invention relates to performing pattern recognition after noise reduction.

A pattern recognition system, such as a speech recognition system, takes an input signal and attempts to decode the signal to find a pattern represented by the signal. For example, in a speech recognition system, a speech signal (often referred to as a test signal) is received by the recognition system and is decoded to identify a string of words represented by the speech signal.

To decode the incoming test signal, most recognition systems utilize one or more models that describe the likelihood that a portion of the test signal represents a particular pattern. Examples of such models include Neural Nets, Dynamic Time Warping, segment models, and Hidden Markov Models.

Before a model can be used to decode an incoming signal, it must be trained. This is typically done by measuring input training signals generated from a known training pattern. For example, in speech recognition, a collection of speech signals is generated by speakers reading from a known text. These speech signals are then used to train the models.

In order for a model to work optimally, the signals used to train the model should be similar to the eventual test signals that are decoded. In particular, it is desirable that the training signals contain the same amount and type of noise as the test signals that are decoded.

Typically, the training signal is collected under "clean" conditions and is considered to be relatively noise free. To achieve this same low level of noise in the test signal, many prior art systems apply noise reduction techniques to the testing data. These noise reduction techniques result in a cleaned test signal that is then used during pattern recognition. In most systems, the noise reduction technique produces a sequence of multi-dimensional feature vectors, with each feature vector representing a frame of a noise-reduced signal.

Unfortunately, noise reduction techniques do not work perfectly and as a result, there is some inherent uncertainty in the cleaned signal. In the past, there have been two general techniques for dealing with such uncertainty. The first has been to ignore the uncertainty and treat the noise reduction process as being perfect. Since this ignores the true state of the recognition system, it results in recognition errors that could be avoided.

The other prior art technique for dealing with uncertainty in noise reduction is to identify frames of the input signal where the noise reduction technique is likely to have performed poorly. In these frames, dimensions of the feature vectors that are likely in error are marked by the noise reduction system so that they are not used during recognition. Thus, the feature vector components that have more than a predetermined amount of uncertainty are completely ignored during decoding. Although such systems acknowledge uncertainty in noise reduction, the technique of completely ignoring a component treats the component as providing no information that would be helpful during recognition. This is highly unlikely because even with a significant amount of uncertainty, the noise-reduced component still provides some information that would be helpful during recognition.

In light of this, a technique is needed that effectively uses the uncertainty in noise reduction during pattern recognition.

SUMMARY OF THE INVENTION

A method and apparatus are provided for using the uncertainty of a noise-removal process during pattern recognition. In particular, noise is removed from a representation of a portion of a noisy signal to produce a representation of a cleaned signal. An uncertainty associated with the noise removal is identified and is used with the representation of the cleaned signal to identify a probability for a phonetic state. In particular embodiments, the uncertainty is used to modify a probability distribution that is used in determining the probability of the phonetic state.

DETAILED DESCRIPTION OF ILLUSTRATIVE EMBODIMENTS

Figure 1:
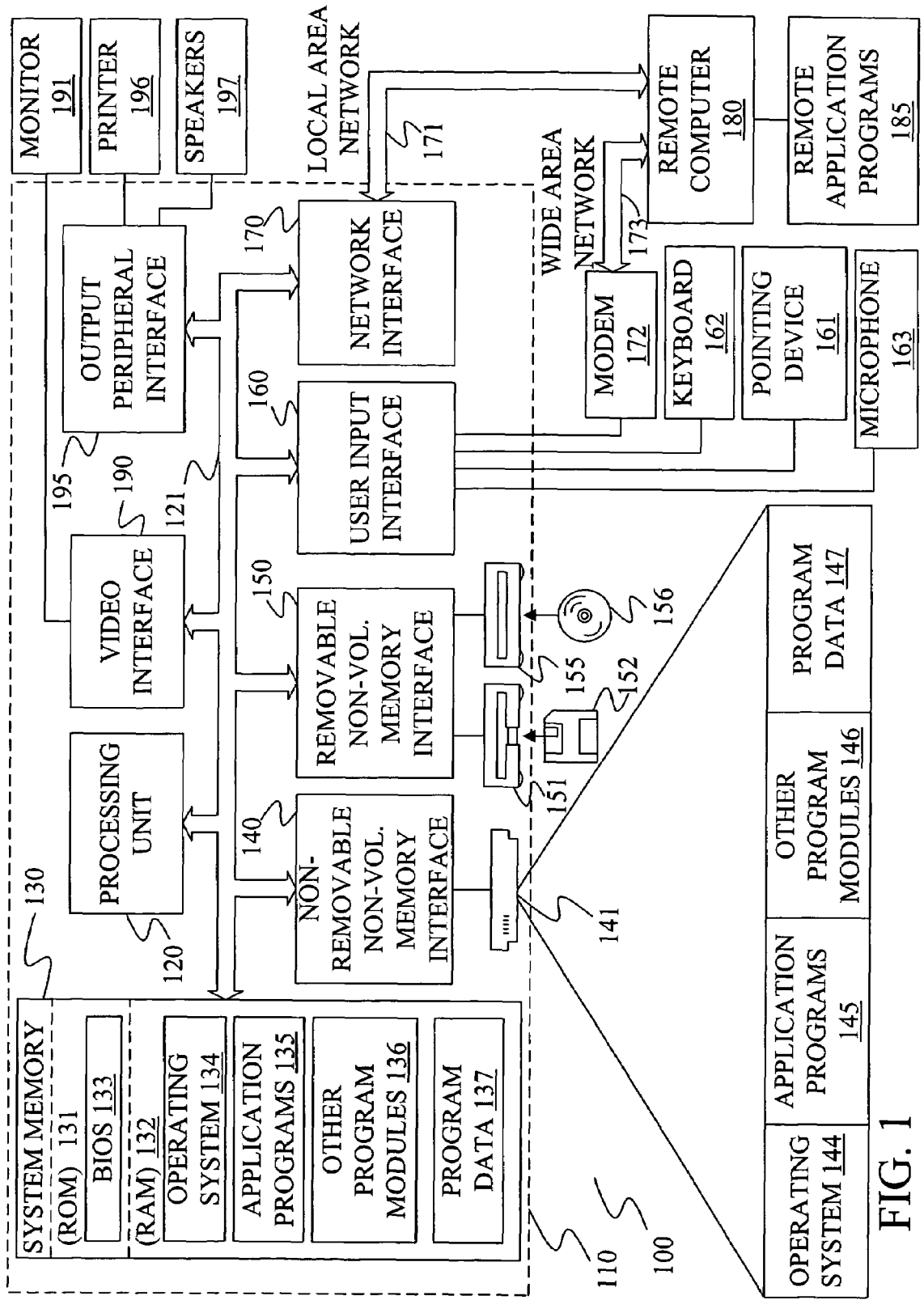
FIG. 1 is a block diagram of one computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
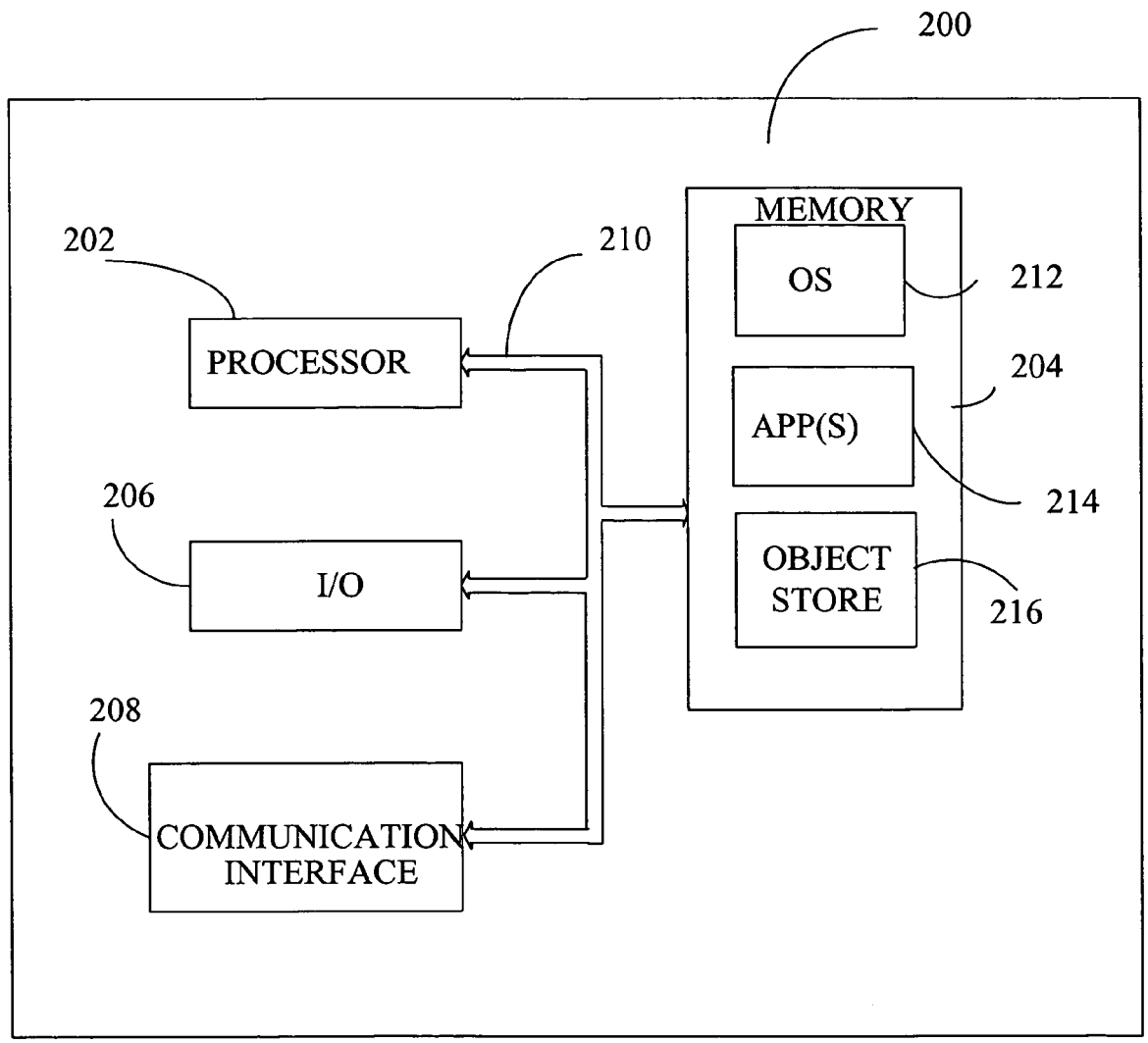
FIG. 2 is a block diagram of an alternative computing environment in which the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

In the discussion below, the present invention is described with reference to speech recognition to facilitate understanding of the invention. However, those skilled in the art will recognize that the present invention is not limited to speech recognition and may be used in any pattern recognition system.

The goal of speech recognition is to convert a speech signal into a sequence of words. To do this, the speech signal is typically divided into overlapping frames of speech and each frame is converted into a feature vector, y, which describes the content of the frame. During recognition, also referred to as decoding, an acoustic model is used to identify a most likely sequence of phonetic states that could be represented by the feature vectors. The resulting sequence of phonetic states represents the decoded sequence of words.

Many acoustic models evaluate a mixture of Gaussians to determine the probability of any one phonetic state. Thus, at each frame, a mixture of Gaussians is evaluated for each phonetic state to identify the most likely phonetic state for the frame. The evaluation of each Gaussian can be viewed as determining p(y|m), which is the probability of the feature vector, y, given the mixture component m for the phonetic state.

When using noise-reduction in combination with speech recognition, a noisy input feature vector, y, is converted into a cleaned feature vector, $\hat{x}$, by the noise-reduction system. The cleaned feature vector represents an estimate of an actual clean feature vector, x. The cleaned feature vector, $\hat{x}$, is then applied as an input signal to the speech recognition system, which attempts to identify a most-likely phonetic state given the cleaned feature vector.

Without noise corruption, the observation vector, y, is the same as the clean vector, x. As such, evaluating a Gaussian for a mixture component for a clean observation vector p(y|m) is the same as evaluating the probability of clean vector x given mixture component m, p(x|m).

However, when the observation vector is corrupted by noise and a noise-reduction system is used, the input to the recognizer is no longer the ideal clean vector, x, but instead is the cleaned feature vector, $\hat{x}$, which is only an estimate of x. In the past, it has been common to simply treat the cleaned feature vector, $\hat{x}$, as if it were equal to the ideal clean feature vector, x. In such cases, evaluating a Gaussian for a mixture component p(y|m) has been approximated by determining the probability p($\hat{x}$|m).

Under the present invention, a more rigorous approach is used in which the probability p(y|m) is determined by marginalizing a joint conditional probability density function p(y,x|m) over all possible unseen clean speech vectors. In terms of an equation:

$$p(y|m) = \int_{-\infty}^{\infty} p(y,x|m)dx \qquad \text{EQ. 1}$$

The right-hand side of EQ. 1 may be expanded so that EQ. 1 becomes:

$$p(y|m) = \int_{-\infty}^{\infty} p(y|x,m)p(x|m)dx \qquad \text{EQ. 2}$$

To make the computations associated with EQ. 2 easier to implement, the probability p(y|x,m) is assumed to be independent of m so that it becomes p(y|x). This probability is then modeled as a Gaussian distribution that describes the certainty of the noise removal process. In particular:

$$p(y|x) = \alpha N(\hat{x};x,\sigma_{\hat{x}}^2) \qquad \text{EQ. 3}$$

where the distribution is defined across the cleaned feature vectors, $\hat{x}$, and has a mean equal to the ideal clean feature vector, x, and a variance, $\sigma_{\hat{x}}^2$, that represents the variance associated with the noise removal process. Note that in EQ. 3 a simplified notation has been used to represent the Gaussian distribution as a single Gaussian across the entire vector. In fact, there is a separate Gaussian, with its own mean and variance, for each dimension of the feature vector. For example:

$$p(y_l|x_l) = \alpha N(\hat{x}_l;x_l,\sigma_{\hat{x},l}^2) \qquad \text{EQ. 4}$$

where $y_l$ is component 1 of the noisy feature vector, $x_l$ is component 1 of the clean feature vector, $\hat{x}_l$ is component 1 of the cleaned feature vector, and $\sigma_{\hat{x},l}^2$ is the variance (also referred to as uncertainty) associated with the noise removal process for component 1 of the feature vectors.

The prior probability, p(x|m) is also modeled as a collection of Gaussian distributions, one for each component of the vector, such that:

$$p(x_l|m) = N(x_l; \mu_{m,l}, \sigma_{m,l}^2) \qquad \text{EQ. 5}$$

where $\mu_{m,l}$ is the mean of the prior distribution, and $\sigma_{m,l}^2$ is the variance of the distribution for component 1 of the feature vectors.

Combining equations 2, 4 and 5 and evaluating the integral provides:

$$p(y_l|m) = \alpha N(\hat{x}_l; \mu_{m,l}, \sigma_{m,l}^2 + \sigma_{\hat{x},l}^2) \qquad \text{EQ. 6}$$

Thus, under the framework of the present invention, the variance of the distribution used in the acoustic model is a combination of the variance associated with the prior model, $\sigma_{m,l}^2$, and the variance or uncertainty associated with the noise removal process, $\sigma_{\hat{x},l}^2$. As a result, if the uncertainty associated with the noise removal process is high for a component, there will be little difference between the probabilities generated for each phonetic state. As a result, the component will have little effect on the decoding of the phonetic state sequence. However, if the uncertainty of the noise removal process is small, the acoustic models for the various phonetic states will generate distinctive probabilities for the component and the component will thereby strongly influence the selection of the phonetic state.

Under one embodiment of the present invention, the uncertainty of the noise removal process is selected based on the noisy input signal. In particular, the noise-reduction module uses the noisy input vector to create a noise-reduced vector and to select an uncertainty for each component of the noise-reduced vector. The noise-reduced vector and a vector containing the various uncertainties, $\sigma_{\hat{x},l}^2$, is then passed to the recognizer. Each component of the noise-reduced vector is applied to the distribution of EQ. 6, which is defined in part by the uncertainty passed in for that component. The resulting probabilities are then used to perform the decoding for finding an optimal phonetic state sequence.

One example of a noise-reduction system that may be used to practice the present invention is a Stereo Piecewise Linear Compensation for Environment (SPLICE) system. Under SPLICE, noise reduction is performed by applying a correction vector, $r_m$, to the noisy input vector, y, to form the cleaned vector, $\hat{x}$.

A method for training the correction vectors under one embodiment of the present invention is described below with reference to the flow diagram of FIG. 3 and the block diagram of FIG. 4. A method of applying the correction vectors and determining uncertainty vectors for noisy feature vectors is described below with reference to the flow diagram of FIG. 5.

Figure 3:
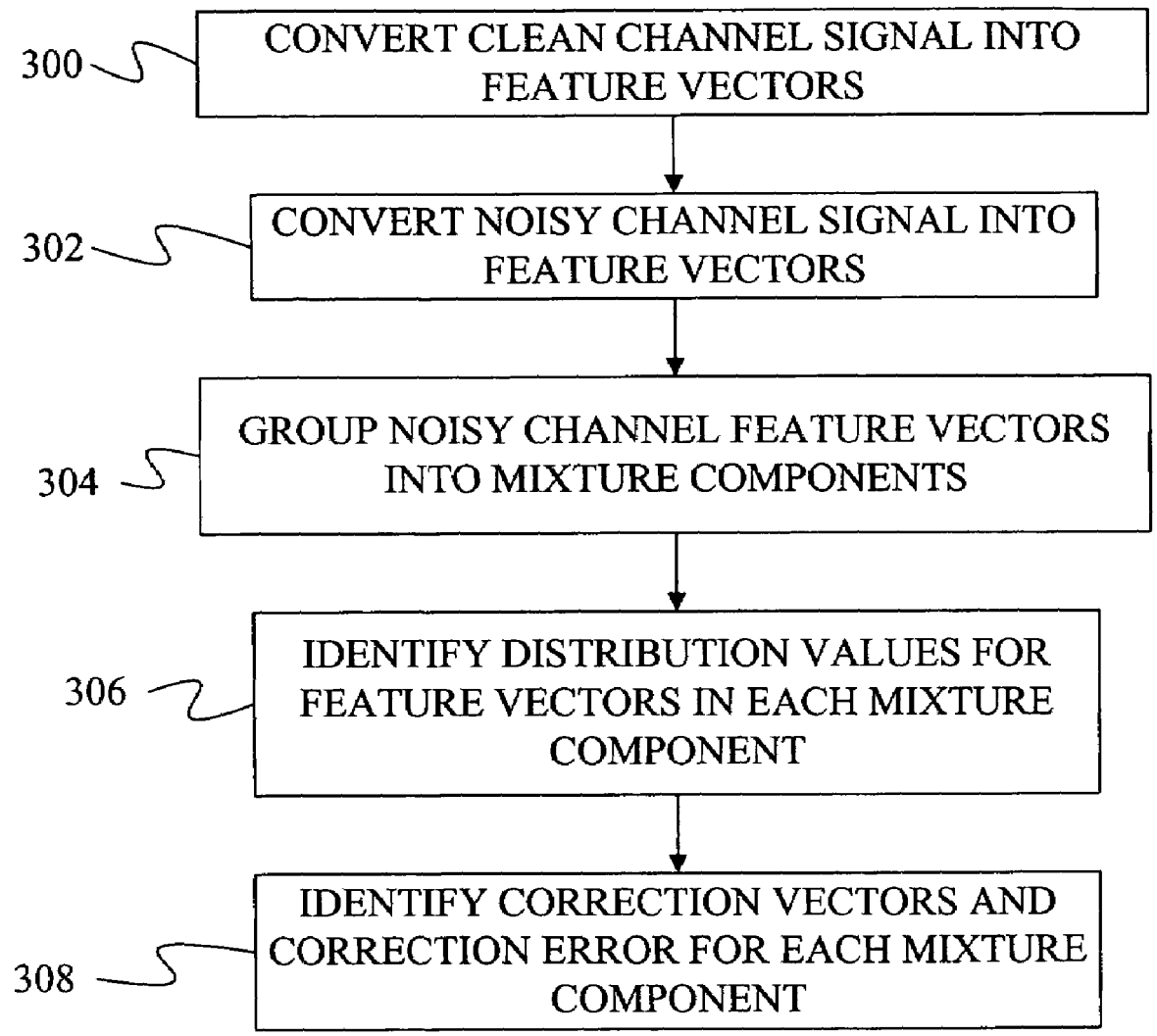
FIG. 3 is a flow diagram of a method of training a noise reduction system under one embodiment of the present invention.

The method of training correction vectors begins in step 300 of FIG. 3, where a "clean" channel signal is converted into a sequence of feature vectors. To do this, a speaker 400 of FIG. 4, speaks into a microphone 402, which converts the audio waves into electrical signals. The electrical signals are then sampled by an analog-to-digital converter 404 to generate a sequence of digital values, which are grouped into frames of values by a frame constructor 406. In one embodiment, A-to-D converter 404 samples the analog signal at 16 kHz and 16 bits per sample, thereby creating 32 kilobytes of speech data per second and frame constructor 406 creates a new frame every 10 milliseconds that includes 25 milliseconds worth of data.

Each frame of data provided by frame constructor 406 is converted into a feature vector by a feature extractor 408. In one embodiment, each feature vector includes a set of static coefficients that describe the static aspects of a frame of speech, a set of delta coefficients that describe current rates of change of the static coefficients, and a set of acceleration coefficients that describe the current rates of change of the delta coefficients. Thus, the feature vectors capture the dynamic aspects of the input speech signal by indicating how the speech signal is changing over time. Methods for identifying such feature vectors are well known in the art and include 39-dimensional Mel-Frequency Cepstrum Coefficients (MFCC) extraction with 13 static coefficients, 13 delta coefficients and 13 acceleration coefficients.

In step 302 of FIG. 3, a noisy channel signal is converted into feature vectors. Although the conversion of step 302 is shown as occurring after the conversion of step 300, any part of the conversion may be performed before, during or after step 300 under the present invention. The conversion of step 302 is performed through a process similar to that described above for step 300.

Figure 4:
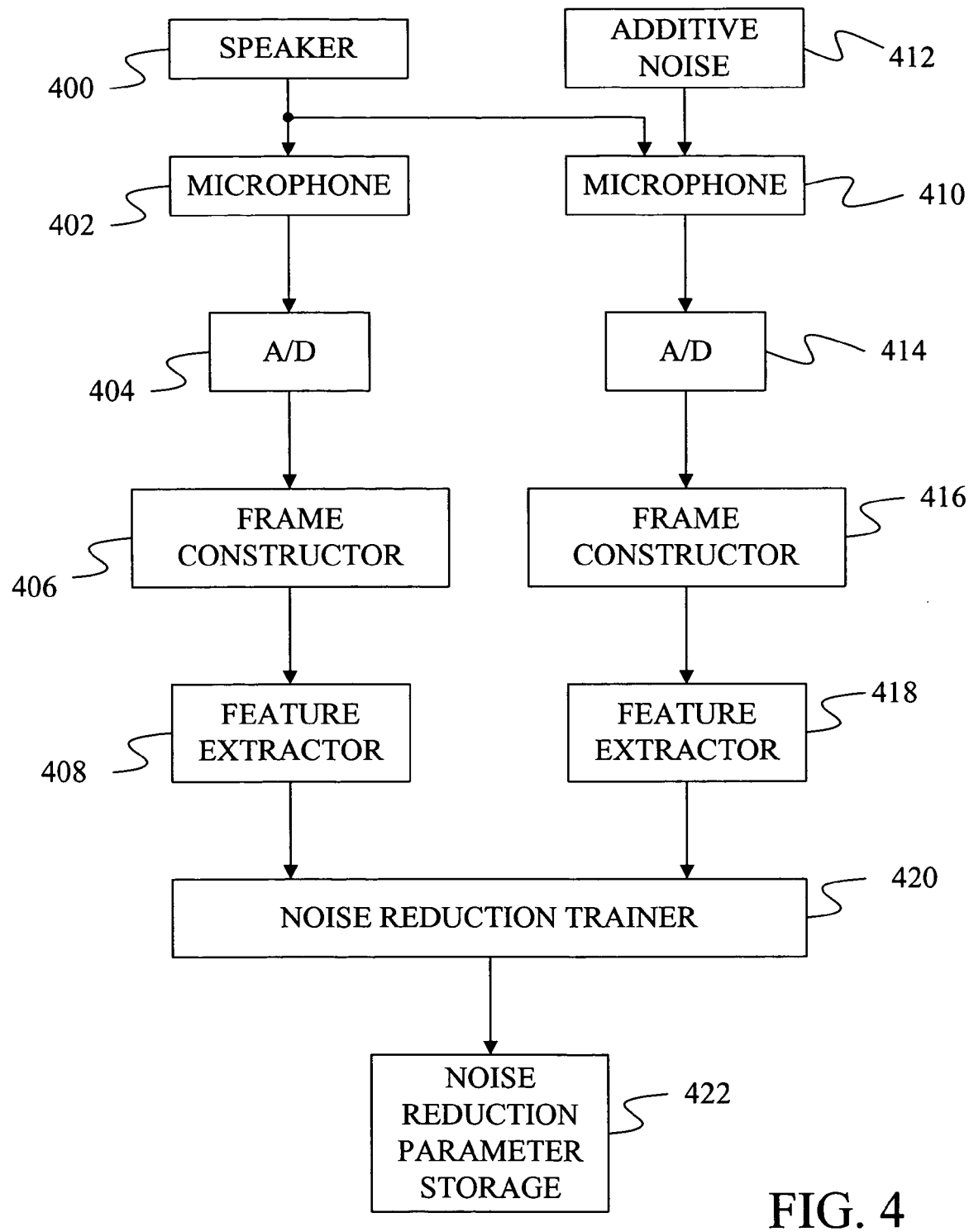
FIG. 4 is a block diagram of components used in one embodiment of the present invention to train a noise reduction system.

In the embodiment of FIG. 4, the process of step 302 begins when the same speech signal generated by speaker 400 is provided to a second microphone 410. This second microphone also receives an additive noise signal from an additive noise source 412. Microphone 410 converts the speech and noise signals into a single electrical signal, which is sampled by an analog-to-digital converter 414. The sampling characteristics for A/D converter 414 are the same as those described above for A/D converter 404. The samples provided by A/D converter 414 are collected into frames by a frame constructor 416, which acts in a manner similar to frame constructor 406. These frames of samples are then converted into feature vectors by a feature extractor 418, which uses the same feature extraction method as feature extractor 408.

In other embodiments, microphone 410, A/D converter 414, frame constructor 416 and feature extractor 418 are not present. Instead, the additive noise is added to a stored version of the speech signal at some point within the processing chain formed by microphone 402, A/D converter 404, frame constructor 406, and feature extractor 408. For example, the analog version of the "clean" channel signal may be stored after it is created by microphone 402. The original "clean" channel signal is then applied to A/D converter 404, frame constructor 406, and feature extractor 408. When that process is complete, an analog noise signal is added to the stored "clean" channel signal to form a noisy analog channel signal. This noisy signal is then applied to A/D converter 404, frame constructor 406, and feature extractor 408 to form the feature vectors for the noisy channel signal.

In other embodiments, digital samples of noise are added to stored digital samples of the "clean" channel signal between A/D converter 404 and frame constructor 406, or frames of digital noise samples are added to stored frames of "clean" channel samples after frame constructor 406. In still further embodiments, the frames of "clean" channel samples are converted into the frequency domain and the spectral content of additive noise is added to the frequency-domain representation of the "clean" channel signal. This produces a frequency-domain representation of a noisy channel signal that can be used for feature extraction.

The feature vectors for the noisy channel signal and the "clean" channel signal are provided to a noise reduction trainer 420 in FIG. 4. At step 304 of FIG. 3, noise reduction trainer 420 groups the feature vectors for the noisy channel signal into mixture components. This grouping can be done by grouping similar noisy feature vectors together using a maximum likelihood training technique or by grouping feature vectors that represent a temporal section of the speech signal together. Those skilled in the art will recognize that other techniques for grouping the feature vectors may be used and that the two techniques listed above are only provided as examples.

After the feature vectors of the noisy channel signal have been grouped into mixture components, noise reduction trainer 420 generates a set of distribution values that are indicative of the distribution of the feature vectors within the mixture component. This is shown as step 306 in FIG. 3. In many embodiments, this involves determining a mean vector and a standard deviation vector for each vector component in the feature vectors of each mixture component. In an embodiment in which maximum likelihood training is used to group the feature vectors, the means and standard deviations are provided as by-products of identifying the groups for the mixture components.

Once the means and standard deviations have been determined for each mixture component, the noise reduction trainer 420 determines a correction vector, $r_m$, for each mixture component, m, at step 308 of FIG. 3. Under one embodiment, the vector components of the correction vector for each mixture component are determined using a weighted least squares estimation technique. Under this technique, the correction vector components are calculated as:

$$r_{i,m} = \frac{\sum_{t=0}^{T-1} p(m|y_t)(x_{i,t} - y_{i,t})}{\sum_{t=0}^{T-1} p(m|y_t)} \qquad \text{EQ. 7}$$

Where $r_{i,m}$ is the $i^{th}$ vector component of a correction vector, $r_m$, for mixture component m, $y_{i,t}$ is the $i^{th}$ vector component for the feature vector $y_t$ in the $t^{th}$ frame of the noisy channel signal, $x_{i,t}$ is the $i^{th}$ vector component for the feature vector in the $t^{th}$ frame of the "clean" channel signal, T is the total number of frames in the "clean" and noisy channel signals, and $p(m|y_t)$ is the probability of the $m^{th}$ mixture component given the feature vector for the $t^{th}$ frame of the noisy channel signal.

In addition, an error associated with the selecting a correction vector is calculated in step 308 as:

$$\Gamma_{i,m} = \frac{\sum_{t=0}^{T-1} p(m|y_t)(x_{i,t} - y_{i,t})^2}{\sum_{t=0}^{T-1} p(m|y_t)} - r_{i,m}^2 \qquad \text{EQ. 8}$$

where $\Gamma_{i,m}$ is the variance, or expected mean squared error, associated with the ith vector component associated with Gaussian mixture component m.

In equations 7 and 8, the $p(m|y_t)$ term provides a weighting function that indicates the relative relationship between the $m^{th}$ mixture component and the current frame of the channel signals.

The $p(m|y_t)$ term can be calculated using Bayes' theorem as:

$$p(m|y_t) = \frac{p(y_t|m)p(m)}{\sum_{all\ m} p(y_t|m)p(m)} \qquad \text{EQ. 9}$$

Where $p(y_t|m)$ is the probability of the noisy feature vector given the $m^{th}$ mixture component, and p(m) is the prior probability of the $m^{th}$ mixture component.

The probability of the noisy feature vector given the $m^{th}$ mixture component, $p(y_t|m)$, can be determined using a normal distribution based on the distribution values determined for the $m^{th}$ mixture component in step 306 of FIG. 3. In one embodiment, the prior probability of the $m^{th}$ mixture component, p(m), is simply the inverse of the number of mixture components. For example, in an embodiment that has 256 mixture components, the probability of any one mixture component is 1/256.

After a correction vector and correction error have been determined for each mixture component at step 308, the process of training the noise reduction system of the present invention is complete. The correction vectors and distribution values for each mixture component are then stored in a noise reduction parameter storage 422 of FIG. 4.

Once a correction vector and its expected mean squared error have been determined for each mixture, they may be used to perform noise reduction and to identify the uncertainty of the noise removal process.

Figure 5:
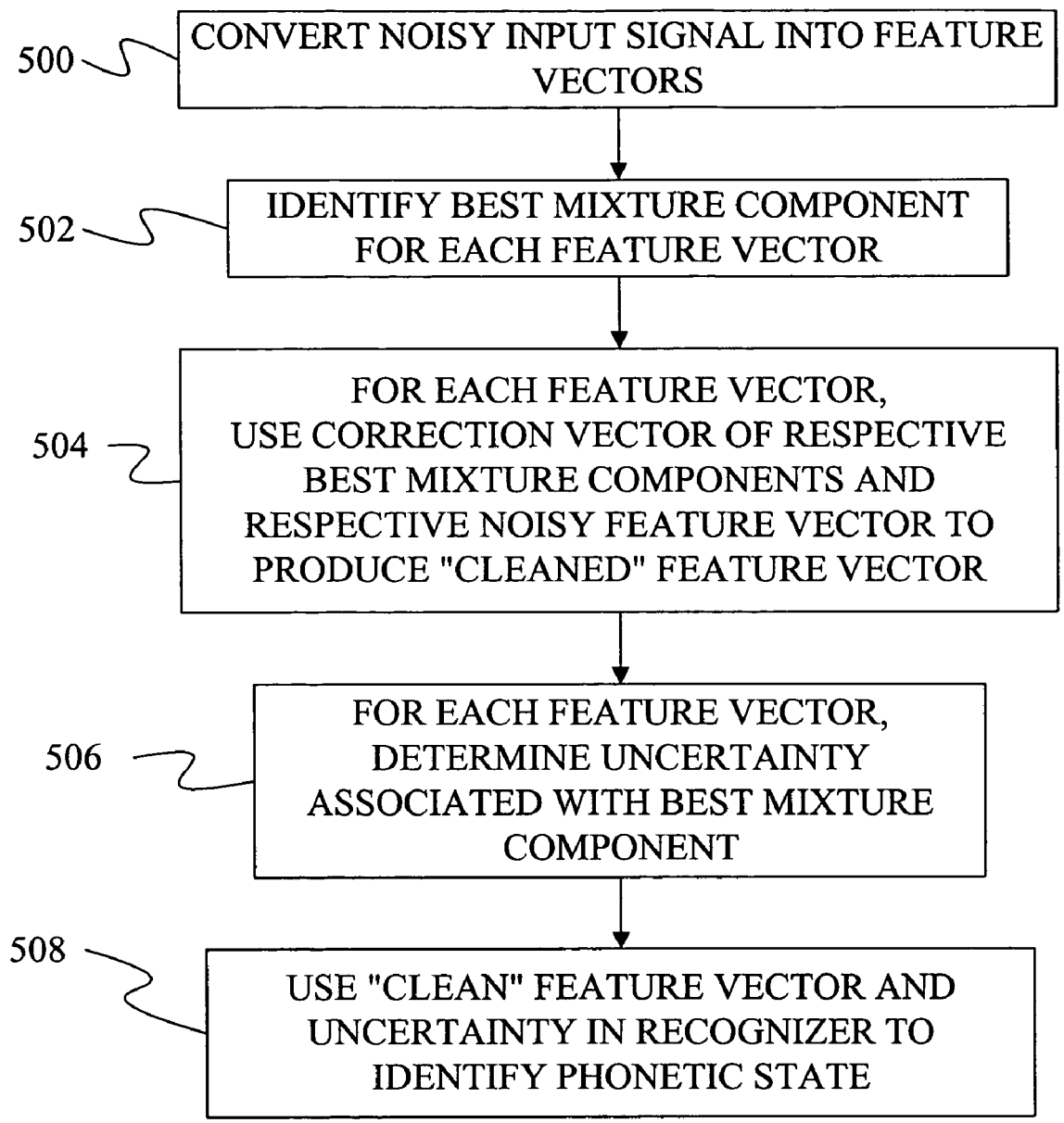
FIG. 5 is a flow diagram of a method of using a noise reduction system under one embodiment of the present invention.

FIG. 5 provides a flow diagram that describes the technique for reducing noise in a training signal and/or test signal and for identifying the uncertainty of the noise removal process. The process of FIG. 5 begins at step 500 where a noisy training signal or test signal is converted into a series of feature vectors. The noise reduction technique then determines which mixture component best matches each noisy feature vector at step 502. This is done by applying the noisy feature vector to a distribution of noisy channel feature vectors associated with each mixture component. In one embodiment, this distribution is a collection of normal distributions defined by the mixture component's mean and standard deviation vectors (assuming diagonal covariance matrices for all multivariate Gaussian distributions). The mixture component that provides the highest probability for the noisy feature vector is then selected as the best match for the feature vector. This selection is represented in an equation as:

$$\hat{m} = \arg_m \max\ c_m N(y; \mu_m, \sigma_m^2) \qquad \text{EQ. 10}$$

Where $\hat{m}$ is the best matching mixture component, $c_m$ is a weight factor for the $m^{th}$ mixture component, $N(y; \mu_m, \sigma_m^2)$ is the value for the individual noisy feature vector, y, from the normal distribution generated for the mean vector, $\mu_m$, and the variance vector, $\sigma_m^2$, of the $m^{th}$ mixture component. In most embodiments, each mixture component is given an equal weight factor $c_m$.

Once the best mixture component for each input feature vector has been identified at step 502, the corresponding correction vector for those mixture components is used with the noisy feature vector to produce the cleaned feature vector at step 504 and to determine the uncertainty associated with the best mixture component at step 506.

To perform steps 504 and 506, distribution parameters associated with the probability p(y|x) are determined. This probability can be calculated as:

$$p(y|x) = \frac{\sum_{all\ m} p(x|y, m) p(y|m) p(m)}{p(x)} \qquad \text{EQ. 11}$$

where the conditional probability p(x|y,m) can be modeled as a Gaussian distribution using the correction vector, $r_m$ and the noise reduction error $\Gamma_m$ such that:

$$p(x|y,m) = N(x; y + r_m, \Gamma_m^2) \qquad \text{EQ. 12}$$

where $y + r_m$ is the mean and $\Gamma_m^2$ is the variance of the conditional distribution.

The prior probability p(x) is determined as:

$$p(x) = \sum_{all\ m} p(x|m)p(m) \qquad \text{EQ. 13}$$

which can be further expanded to:

$$p(x) = \sum_{all\ m} \int_{-\infty}^{\infty} p(x, y|m)p(m)dy \qquad \text{EQ. 14}$$

and ultimately:

$$p(x) = \sum_{all\ m} \int_{-\infty}^{\infty} p(x|y, m)p(y|m)p(m)dy \qquad \text{EQ. 15}$$

Using the distribution of EQ. 12 for p(x|y,m) and a Gaussian distribution having a mean $\mu_m$ and a variance $\sigma_m^2$ for p(y|m), equation 15 becomes:

$$p(x) = \sum_{all\ m} N(x; \mu_m + r_m, \Gamma_m^2 + \sigma_m^2)p(m) \qquad \text{EQ. 16}$$

In order to simplify the calculation of EQ. 16, the mixture of Gaussians is approximated by a single Gaussian of the form:

$$p(x) \approx N(x; \mu_x, \sigma_x^2) \qquad \text{EQ. 17}$$

where $$\mu_x = \sum_{all\ m} (\mu_m + r_m)p(m) \qquad \text{EQ. 18}$$

$$\sigma_x^2 = \sum_{all\ m} ((\mu_m + r_m)^2 + \sigma_m^2 + \Gamma_m^2)p(m) - \mu_x^2 \qquad \text{EQ. 19}$$

Combining equations 11, 12 and 17 results in:

$$p(y|x) = \frac{\sum_{all\ m} N(x; y + r_m, \Gamma_m^2)p(y|m)p(m)}{N(x; \mu_x, \sigma_x^2)} \qquad \text{EQ. 20}$$

which can be rewritten as:

$$p(y|x) = \sum_{all\ m} N\left(x; \hat{x}_m, \sigma_{\hat{x}_m}^2\right) p(y|m) p(m) \qquad \text{EQ. 21}$$

where:

$$\hat{x}_m = \frac{\sigma_x^2(y + r_m) - \Gamma_m^2 \mu_x}{\sigma_x^2 - \Gamma_m^2} \qquad \text{EQ. 22}$$

$$\sigma_{\hat{x}_m}^2 = \frac{\sigma_x^2 \Gamma_m^2}{\sigma_x^2 - \Gamma_m^2} \qquad \text{EQ. 23}$$

Equation 22 defines the cleaned feature vector, $\hat{x}_m$, and equation 23 defines the uncertainty, $\sigma_{\hat{x}_m}^2$, in the noise-reduction process, which are both provided to the recognizer to be used in step 508 to identify a phonetic state as discussed above in connection with EQ. 6. Note that because the uncertainty of the noise-reduction process as defined in EQ. 23 is not dependent on the observed noisy feature vector, the uncertainty under this embodiment may be trained at the time the correction vector and correction error are trained instead of after the noisy feature vector is received. In such embodiments, a separate uncertainty is trained for each mixture component and the uncertainty is selected based on the best matching mixture component for the observed noisy feature vector. This eliminates the need to compute all terms in the sum of EQ 21, and it approximates the sum while drastically reducing computational complexity.

Figure 6:
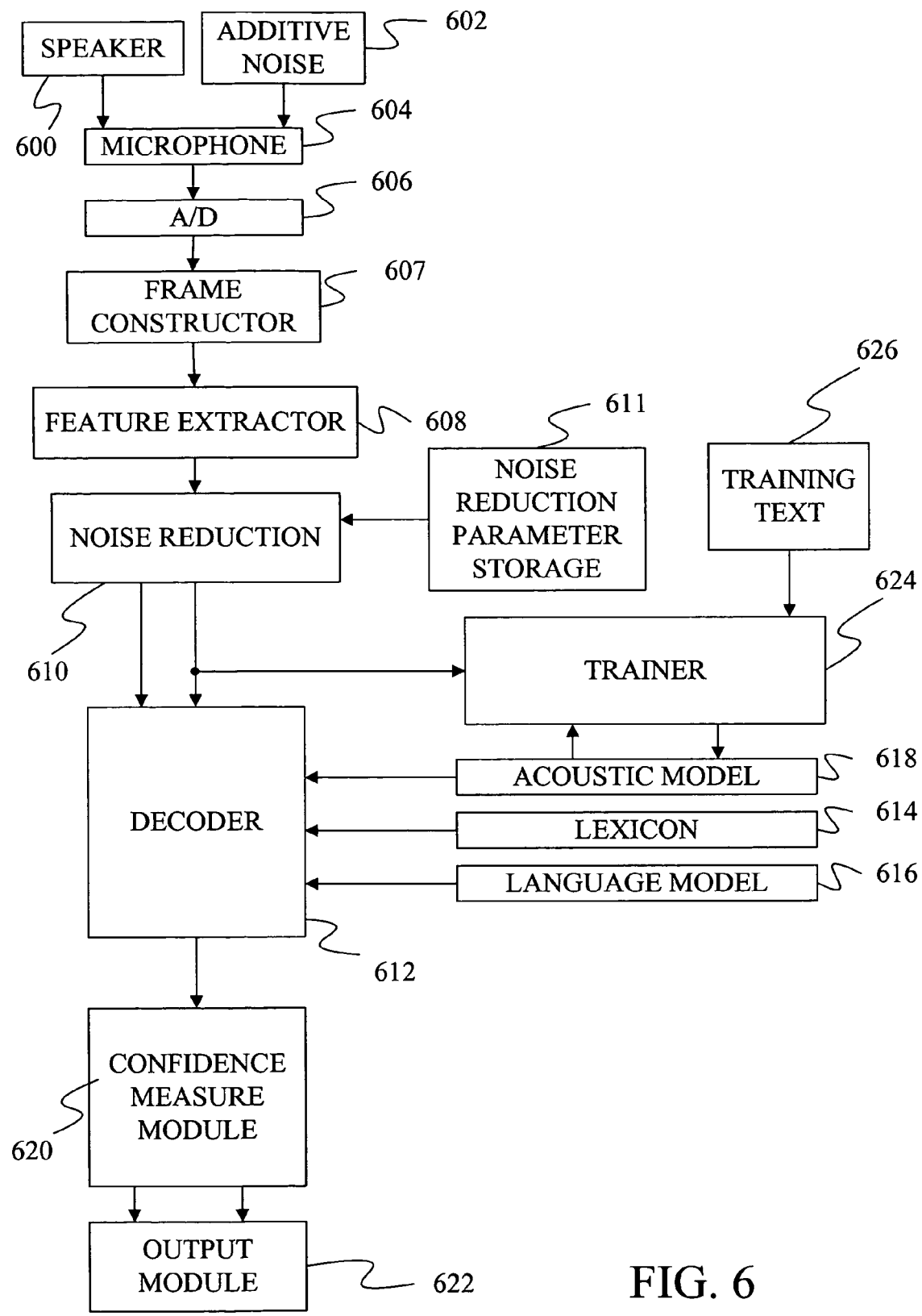
FIG. 6 is a block diagram of a pattern recognition system in which the present invention may be used.

FIG. 6 provides a block diagram of an environment in which the noise reduction and recognition technique of the present invention may be utilized.

In FIG. 6, a speaker 600, either a trainer or a user, speaks into a microphone 604. Microphone 604 also receives additive noise from one or more noise sources 602. The audio signals detected by microphone 604 are converted into electrical signals that are provided to analog-to-digital converter 606.

Although additive noise 602 is shown entering through microphone 604 in the embodiment of FIG. 6, in other embodiments, additive noise 602 may be added to the input speech signal as a digital signal after A-to-D converter 606.

A-to-D converter 606 converts the analog signal from microphone 604 into a series of digital values. In several embodiments, A-to-D converter 606 samples the analog signal at 16 kHz and 16 bits per sample, thereby creating 32 kilobytes of speech data per second. These digital values are provided to a frame constructor 607, which, in one embodiment, groups the values into 25 millisecond frames that start 10 milliseconds apart.

The frames of data created by frame constructor 607 are provided to feature extractor 608, which extracts a feature from each frame. The same feature extraction that was used to train the noise reduction parameters (the correction vectors, means, and standard deviations of the mixture components) is used in feature extractor 608.

The feature extraction module produces a stream of feature vectors that are each associated with a frame of the speech signal. This stream of feature vectors is provided to noise reduction module 610 of the present invention, which uses the noise reduction parameters stored in noise reduction parameter storage 611 to reduce the noise in the input speech signal using the techniques discussed above. In addition, noise reduction module 610 identifies a uncertainty associated with the noise removal for the current frame.

For each frame, the output of noise reduction module 610 is a "cleaned" feature vector and an uncertainty associated with the cleaned feature vector. If the input signal is a training signal, each of "cleaned" feature vectors is provided to a trainer 624, which uses the "cleaned" feature vectors and a training text 626 to train an acoustic model 618. Techniques for training such models are known in the art and a description of them is not required for an understanding of the present invention.

If the input signal is a test signal, the "cleaned" feature vectors and the respective uncertainties are provided to a decoder 612, which identifies a most likely sequence of words based on the stream of feature vectors, a lexicon 614, a language model 616, the acoustic model 618, and the uncertainty of the noise removal process as discussed above in connection with EQ. 6.

The most probable sequence of hypothesis words is provided to a confidence measure module 620. Confidence measure module 620 identifies which words are most likely to have been improperly identified by the speech recognizer, based in part on a secondary acoustic model (not shown). Confidence measure module 620 then provides the sequence of hypothesis words to an output module 622 along with identifiers indicating which words may have been improperly identified. Those skilled in the art will recognize that confidence measure module 620 is not necessary for the practice of the present invention.

Although FIG. 6 depicts a speech recognition system, the present invention may be used in any pattern recognition system and is not limited to speech.

Although the present invention has been described with reference to particular embodiments, workers skilled in the art will recognize that changes may be made in form and detail without departing from the spirit and scope of the invention.

What is claimed is:

1. A method of recognizing acoustic states from a noisy speech signal, the method comprising:
    removing noise from a representation of a portion of the noisy speech signal to produce a representation of a portion of a cleaned speech signal, wherein removing noise from a representation of a portion of a noisy speech signal comprises removing noise from a feature vector representing a frame of the noisy speech signal and wherein removing noise from a feature vector comprises:
    identifying a mixture component based on the feature vector for the noisy speech signal;
    identifying a correction vector and an error value associated with the correction vector based on the identified mixture component; and
    using the correction vector, the error value, and the feature vector for the noisy speech signal to identify a feature vector for a frame of the cleaned speech signal;
    identifying an uncertainty associated with removing the noise;
    using the uncertainty to adjust a probability distribution associated with an acoustic state to form a modified probability distribution; and
    applying the representation of a portion of the cleaned speech signal to the modified probability distribution to decode an acoustic state for speech recognition.

2. The method of claim 1 wherein adjusting a probability distribution comprises adding the uncertainty to a variance of the probability distribution to form the modified probability distribution.

3. The method of claim 1 wherein the representation of a portion of the noisy speech signal comprises a component of a feature vector representing a frame of the noisy speech signal and wherein the representation of a portion of the cleaned speech signal comprises a component of a feature vector representing a frame of the cleaned speech signal.

4. The method of claim 3 wherein identifying an uncertainty comprises identifying an uncertainty associated with removing noise from the component of the feature vector for the noisy speech signal to form the component of the feature vector for the cleaned signal.

5. The method of claim 4 wherein using the uncertainty to adjust a probability distribution comprises using the uncertainty to adjust a probability distribution associated with the component of the feature vector.

6. The method of claim 1 wherein identifying an uncertainty comprises utilizing the error value associated with the correction vector to determine the uncertainty.

7. A computer-readable medium having computer-executable instructions for performing steps comprising:
    converting a frame of a noisy speech signal into a feature vector comprising at least two components;
    removing noise from a component of the feature vector for the noisy speech signal to produce a component of a feature vector for a cleaned speech signal, wherein removing noise comprises:
    identifying a correction vector based on the feature vector for the noisy speech signal; and
    using the correction vector and the feature vector for the noisy speech signal to form the feature vector for the cleaned speech signal;
    identifying an uncertainty associated with removing the noise from the component;
    determining a probability component of a probability for a phonetic state by applying the component for the cleaned speech signal to a distribution for the phonetic state defined in part by the uncertainty associated with removing the noise from the component by computing a variance for the distribution using the uncertainty as a term in the computation; and
    using the probability component to determine the probability of the phonetic state during speech recognition regardless of the value of the uncertainty.

8. The computer-readable medium of claim 7 wherein defining a probability distribution comprises adding the uncertainty to a variance of a probability distribution.

9. The computer-readable medium of claim 7 wherein identifying a correction vector comprises identifying a mixture component based on the feature vector for the noisy speech signal and selecting a correction vector associated with the mixture component.

10. The computer-readable medium of claim 9 wherein identifying an uncertainty comprises:
    identifying an error associated with the mixture component; and
    utilizing the error to calculate the uncertainty.

* * * * *